No. 692,919. Patented Feb. 11, 1902.
E. E. & A. M. SCHAUMLOEFFEL.
CAKE PAN.
(Application filed Mar. 19, 1901.)
(No Model.)

Witnesses:
H. E. Rodgers.
Arthur McArthur

Inventors:
E. E. and A. M. Schaumloeffel
By Fischer + Thorpe
attys.

THE NORRIS PETERS CO., PHOTO-LITHO., WASHINGTON, D. C.

UNITED STATES PATENT OFFICE.

ELEANOR E. SCHAUMLOEFFEL AND ALLAN M. SCHAUMLOEFFEL, OF KANSAS CITY, MISSOURI.

CAKE-PAN.

SPECIFICATION forming part of Letters Patent No. 692,919, dated February 11, 1902.

Application filed March 19, 1901. Serial No. 51,825. (No model.)

*To all whom it may concern:*

Be it known that we, ELEANOR E. SCHAUMLOEFFEL and ALLAN M. SCHAUMLOEFFEL, citizens of the United States, residing at Kansas City, in the county of Jackson and State of Missouri, have invented certain new and useful Improvements in Cake-Pans, of which the following is a specification.

Our invention relates to cake-pans, and more particularly to that class for facilitating and insuring the removal of the cake when baked without breaking the crust without resorting to the use of greased paper or its equivalent commonly used with an ordinary pan when baking cakes, our object being to produce a pan of this character of simple, strong, durable, and cheap construction.

To these ends the invention consists in certain novel and peculiar features of construction and organization, as hereinafter decribed and claimed, and in order that it may be fully understood reference is to be had to the accompanying drawings, in which—

Figure 1:
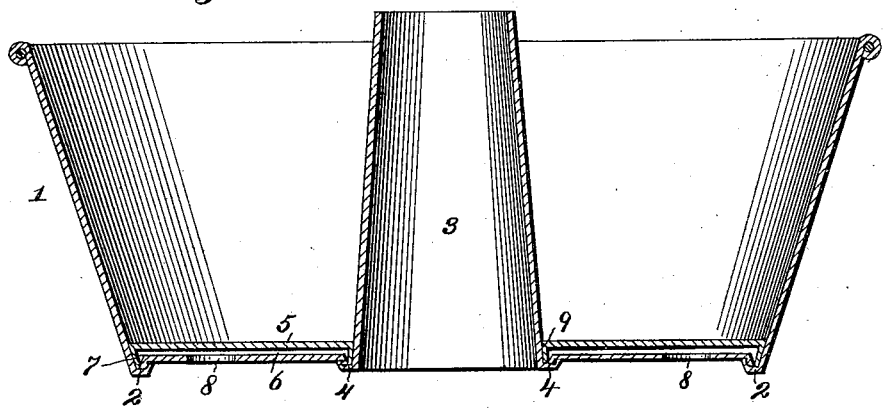
Figure 2:
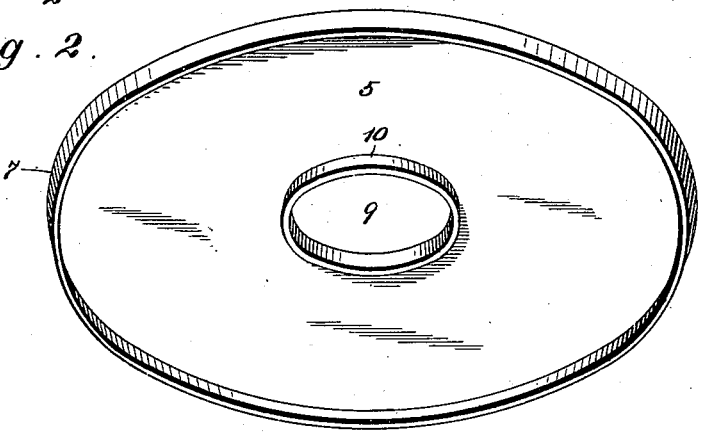

Figure 1 represents a central vertical section of a cake-pan embodying our invention. Fig. 2 is a perspective view of the false bottom.

In the said drawings, 1 designates a pan of round or rectangular form, depressed to form a groove 2 at the junction of its bottom and walls, which forms a rib on the under side of the pan, and this acts as a support. Where the pan is of circular form and provided with the upwardly-projecting conical center piece 3, it is provided with a second groove 4, which likewise forms a rib on the under side to act as a central support, the same being formed at the junction of the bottom and said center piece.

5 designates the false bottom of the pan, the same fitting snugly therein and corresponding in contour thereto, but of larger diameter in order to provide an air-space 6 between it and the permanent bottom of the pan, and in order to strengthen and thereby increase the durability of said false bottom it is provided with a marginal flange 7, extending completely around it and tapering downward and inward to correspond exactly with and fit snugly against the wall of the pan, and in order that this false bottom may be readily removed when desired or necessary the permanent bottom is provided with a plurality of holes 8, through which one's fingers or thumbs may project in order to press the false bottom away from the permanent bottom, and thereby effect the removal of the cake without breaking the bottom crust, it being understood that after the cake is removed a thin knife-blade can be readily introduced between the false bottom and the bottom of the cake in order to effect the release of the former without breaking the crust at any point.

With the style of pan shown in Fig. 1 the false bottom is provided with a central hole 9, surrounded by a depending annular flange 10, flaring downward to correspond with the taper of the conical piece 3 and fitting squarely against the latter and in the groove 4.

With any style of pan it is preferable to provide the air-space 6, which serves to retard slightly the baking action at a point where it is usually most active in the majority of ovens. The cake is thus baked more uniformly throughout.

While we have described this pan as a "cake-pan," it is to be understood, of course, that it may be used in any connection where it is applicable—such, for instance, as baking puddings—and it will also be understood that by reason of the marginal flange or flanges the false bottom is stiffened to such an extent as to practically eliminate all chance of warpage, and therefore of a loose joint between it and the pan, this being very objectionable, for the reason that the dough sometimes will enter such joint and make it impossible to remove the cake without breaking the crust. All of the pans embodying a removable bottom with which we are familiar are objectionable, because of the fact that they invariably warp after short service and permit the dough at times—usually according to the kind or condition—to work its way between the wall and the edge of the bottom.

The pan embodying our invention, of course, is to be constructed of sheet metal and is adapted to be made by means of dies in the usual manner.

Having thus described the invention, what we claim as new, and desire to secure by Letters Patent, is—

1. The combination with a cake-pan provided with a conical central piece and having at the junction of its walls and central piece with the bottom parallel grooves or channels with their sides inclined opposite to each other; of a removable bottom provided with parallel depending converging flanges inclined at the same angles as those of the sides of said grooves and adapted to fit snugly thereto, as and for the purpose set forth.

2. The combination with a circular cake-pan provided with a central piece and having at the junction of its walls and central piece with the bottom concentric grooves or channels with inclined sides; of a removable bottom provided with concentric depending flanges inclined at the same angles as those of the sides of said grooves and adapted to fit snugly thereto, as and for the purpose set forth.

In testimony whereof we affix our signatures in the presence of two witnesses.

ELEANOR E. SCHAUMLOEFFEL.
ALLAN M. SCHAUMLOEFFEL.

Witnesses:
H. C. RODGERS,
G. Y. THORPE.